J. J. KUPKA 2,593,037

VALVE CHEST INSERT FOR PRESSURE FLUID
OPERATED RECIPROCATING ENGINES

Filed Feb. 13, 1947

John J. Kupka
INVENTOR

BY Maurice Bloch

ATTORNEY

UNITED STATES PATENT OFFICE 2,593,037

VALVE CHEST INSERT FOR PRESSURE FLUID OPERATED RECIPROCATING ENGINES

John J. Kupka, Gladstone, N. J., assignor to Jupiter Steam Appliances, Inc., New York, N. Y., a corporation of New York Application February 13, 1947, Serial No. 728,288

5 Claims. (Cl. 121—185)

This invention relates to valve gears for steam engines of the locomotive or marine type in which the distribution of steam is effected through piston valves, or slide valves, which are actuated through a link motion, such as the Stephenson, Walschaert or Baker type. Very often it is desirable to improve the steam economy of such engines through the application of poppet valves instead of the piston valves or slide valves, which have inherent shortcomings such as interdependence of steam admission events and exhaust events, lubrication difficulties, etc. Such an application of poppet valves requires the changing of the existing cylinders and the cost factor is quite an important item to consider in order to justify the extra expense of a conversion to use poppet valves. This is especially true in the case of locomotive steam engines which are equipped with engine bed castings which have the power cylinders cast integrally with the main locomotive frames. To modify such a locomotive steam engine to use poppet valves instead the existing piston valves would normally require a complete new engine bed casting, which is a very costly item. One object of the present invention is the provision of novel and improved adapter pieces which house the poppet valves, their seats and guides and cams, so designed, that they can be expediently applied to the steam chests of the already existing piston valve cylinders. In the prior art, various proposals for such adapter pieces, commonly referred to as steam chest inserts, have been made. On account of insufficiency of passage area through the exhaust poppet valves no actually successful reduction into practice was made for steam locomotive engines. In the contemplated invention, through novel disposition of the poppet valves, the above mentioned shortcoming of insufficient passage area through the exhaust poppet valves is overcome, through the provision of two or more exhaust valves for each steam chest insert operatively connected with each side of the piston working within the power cylinder of a steam engine.

Another drawback of steam chest insert proposals of the prior art to accommodate poppet valves in lieu of piston valves in steam engines is created by the provision of concentric spindles for the steam admission and exhaust valves which are intended to slide within each other. When it is considered, that modern high powered steam engines of the reciprocating type use superheated steam as a rule, with steam chest temperatures exceeding very often 700 degrees Fahrenheit, the question of lubrication of sliding surfaces becomes a matter of paramount importance. This is especially the case where poppet valve spindles are concerned. In order to withstand the bending moments exerted by the steam flow reaction, the poppet valve spindles have to be made of high tensile strength steel with hardened wearing surfaces to resist the abrasive effect of the sliding movement of said poppet valve spindles within their respective guide bushings. As the very nature of a reliable poppet valve gear for steam engines of the character under review precludes the use of valve spindle packings and relies on a labyrinth action instead to keep steam tightness of valve spindles in their guide bushings, the working clearances between poppet valve spindle and guide bushing have to be very small. Actual practice has shown that approximately one to two thousandths of one inch of working clearance gives good results. To prevent wear between these sliding surfaces, lubrication is essential and it is common practice to force oil suitable for superheated steam under high pressure into the valve spindle guide bushings through holes the location of which has to be carefully determined in order to ensure distribution of lubricant all over the poppet valve spindle. So important is the uninterrupted supply of lubricant to the correct functioning of any poppet valve gear for steam engines using superheated steam disclosed by the prior art, that temporary obstructions which cause a stoppage of oil supply to the poppet valve spindles are likely to result in stuck valves which mean failure of the steam distribution with all its consequences. By comparing the lubricating conditions of the poppet valve spindles of the invention disclosed in this specification with the arrangements of two concentric poppet valve spindles, sliding one within the other as disclosed by the prior art, it will be seen at once, that an improvement of paramount importance is made. Two poppet valve spindles, which are concentric and slide within each other present very difficult lubricating problems. Oil fed under high pressure will flow in the direction of least resistance and thus it will be the outer poppet valve spindle which will receive all the oil, with little left for the inner poppet valve spindle. Another drawback of such an arrangement of concentric poppet valve spindles is the effect of cumulative working clearances on the trueness of poppet valve spindle centre line to the surface of the valve seatings. Pressure fluid tightness is adversely affected if an excessive amount of play exists between poppet valve spindle and its guide bushing, since no correct seating of the valves is possible. Concentric poppet valve spindles are therefore not practical from the standpoint of steam or pressure fluid tightness of the valves and the arrangement disclosed by the new invention constitutes therefore an improvement over the prior art in this respect.

Still another objective of the present invention is the provision of a novel design which permits the easy machining, assembly and disassembly of the component parts of the steam chest inserts containing the poppet valve gear. When the construction of such steam chest inserts of the prior art is examined, it will be seen, that their removal for inspection purposes for instance, from the steam chest of the power cylinders, presents certain difficulties. It is common knowledge, that steam chests of superheated reciprocating steam engines are liable to be covered by carbon deposits after a certain length of service. Such deposits, which are caused by impurities in the mineral oils used for lubrication, are very hard and most difficult to remove without scraping. Any steam chest insert, designed to accommodate poppet valves for the purpose of steam distribution, should be removable as an integral unit, regardless of carbon deposits, accumulated in service. It should moreover be so constructed, that the geometric relation of poppet valve seats and cam shaft centre lines, should not be subject to any changes in service. This is essential in order to maintain proper cam action and recent experience with locomotive poppet valve gears, in which movement of the cam shaft centres with respect to their valve seats occurred, as the result of faulty design features of the cam shaft driving mechanism, demonstrated an epidemic of broken poppet valves with serious consequences in respect of locomotive availability and high cost of maintenance. The new invention offers a further important advantage over the constructions of the prior art, because it permits the ready assembly into the steam chest of the existing cylinders of an integral unit, which contains all the valves, spindles, cams and bearings. Carbon deposits can be removed on the working bench, after removal of these steam chest inserts as a unit and no time consuming effort is required to effect such removal of the inserts from the steam chest. No disturbance of the relative positions of cam shaft centre lines and poppet valve seats is possible in service. This feature of removal of the steam chest insert assembly as an integral unit makes the new invention particularly adaptable to locomotive maintenance routine, which is not very well suited to delicate adjustment operations on the locomotive itself. Instead it is preferable to repair sub-assemblies of important pieces of locomotive mechanism in centrally located work shops. Since a modern steam locomotive or a reciprocating steam engine equipped ship represents a capital investment of considerable magnitude, it is necessary to reduce the "out-of-service" time as much as possible. The power cylinders of such equipment require comparatively little maintenance work. As regards the valve gear mechanism in the steam distribution, the new invention offers the possibility of greatly reducing "out-of-service" hours due to maintenance work on that part of the mechanism, as it takes only a few hours to remove a defective steam chest insert and apply another unit taken from a stock of spare units kept in readiness for emergencies. The piston valves are standardized to a great extent and thus the new invention, by being adapted to the existing piston valve design of steam locomotives or reciprocating marine engines, is likewise a standardized article. Its relatively small size and compactness of construction lends itself particularly well to locomotive maintenance, as in cases of emergency the steam chest inserts can be changed almost anywhere on the road, without the need of special appliances or lifting tackle. Reference is made in this connection to the advantage of the new invention over a poppet valve gear of the prior art installed on a large number of modern steam locomotives, in which it is necessary to remove the brake rigging first in order to gain access to the poppet valve mechanism, which weighs several tons and which is located in a most inaccessible position.

Still another object of my new invention, as far as steam locomotive application is concerned, is the elimination of high temperature effects on the cam mechanism which actuates the poppet valves. By exposing the cam housing end covers of the new invention to the cooling effect of the air currents engendered by the movement of the locomotive, the effects of convection of heat on the cam operating mechanism are minimized. High temperatures within the cam boxes of locomotive poppet valve gears of known designs cause lubrication problems due to formation of deposits of carbonaceous matter on wearing surfaces. Sometimes the high temperatures in the cam boxes also affect adversely the hardness of the cam and roller surfaces.

Another drawback which is met with in known steam chest inserts to adapt existing locomotive or marine engine piston valve cylinders to the use of poppet valves is that adjustment of the correct clearances between the cams and poppet valve spindle rollers is difficult to make and to check. In order to remedy such drawback, according to my invention, the cam mechanism is contained in a specially constructed housing, with easily removable inspection covers, which permit visual inspection of all working parts, without disturbance of the assembly of the aforesaid mechanism.

In accordance with this invention these and other advantages which are incident to its application are secured by a preferred embodiment which is illustrated by the accompanying drawings.

In these drawings.

Similar numerals indicate corresponding parts throughout the detailed illustrations.

Figure 1:
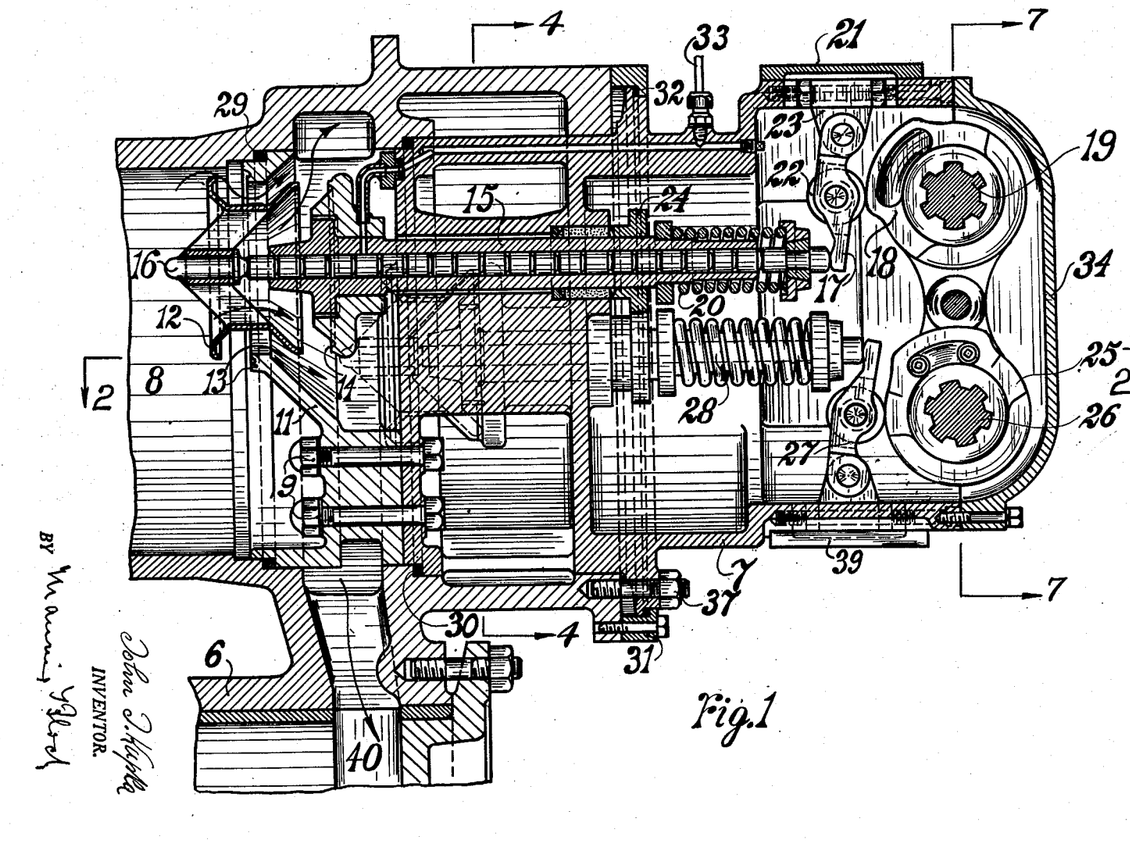
Fig. 1 is a sectional view in side elevation of the apparatus disclosed in this specification following line 1—1 of Fig. 2.
Figure 2:
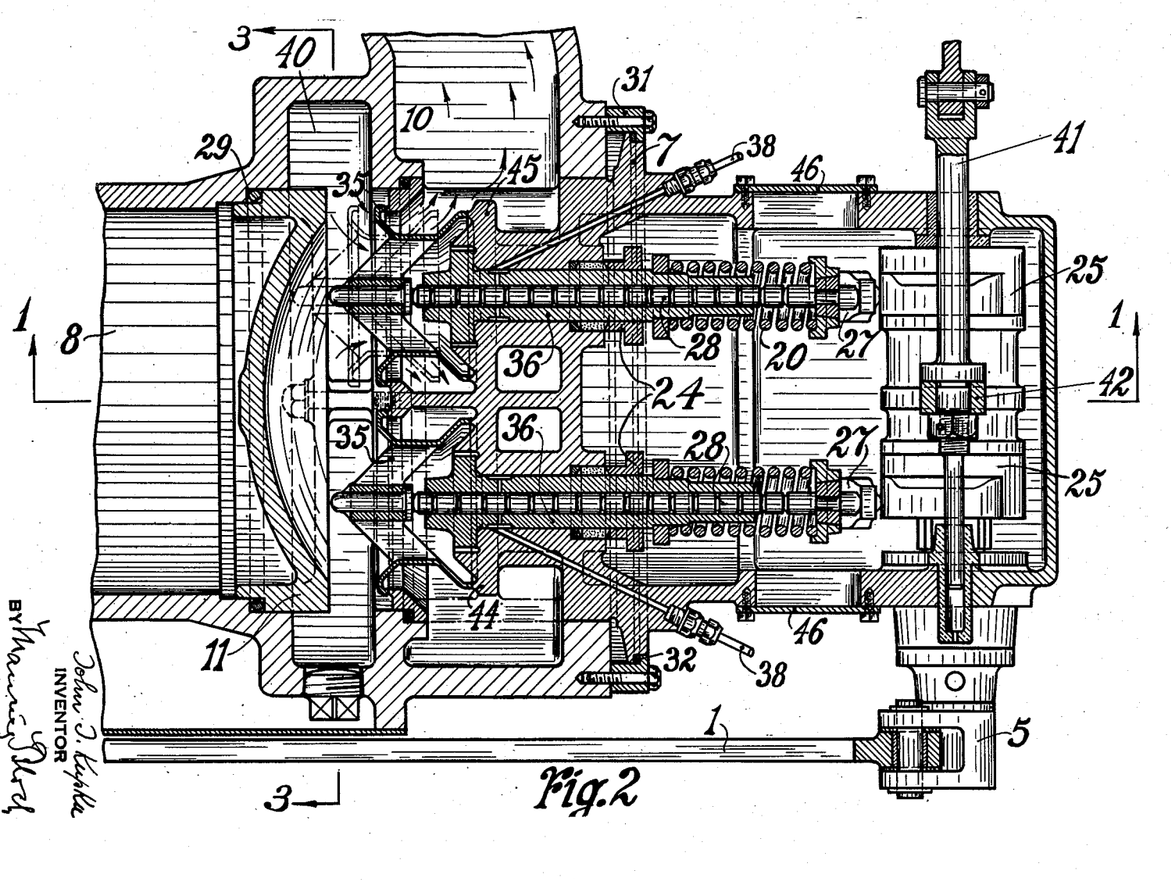
Fig. 2 is a sectional plan view of the apparatus disclosed in this specification following line 2—2 of Fig. 1.
Figure 6:
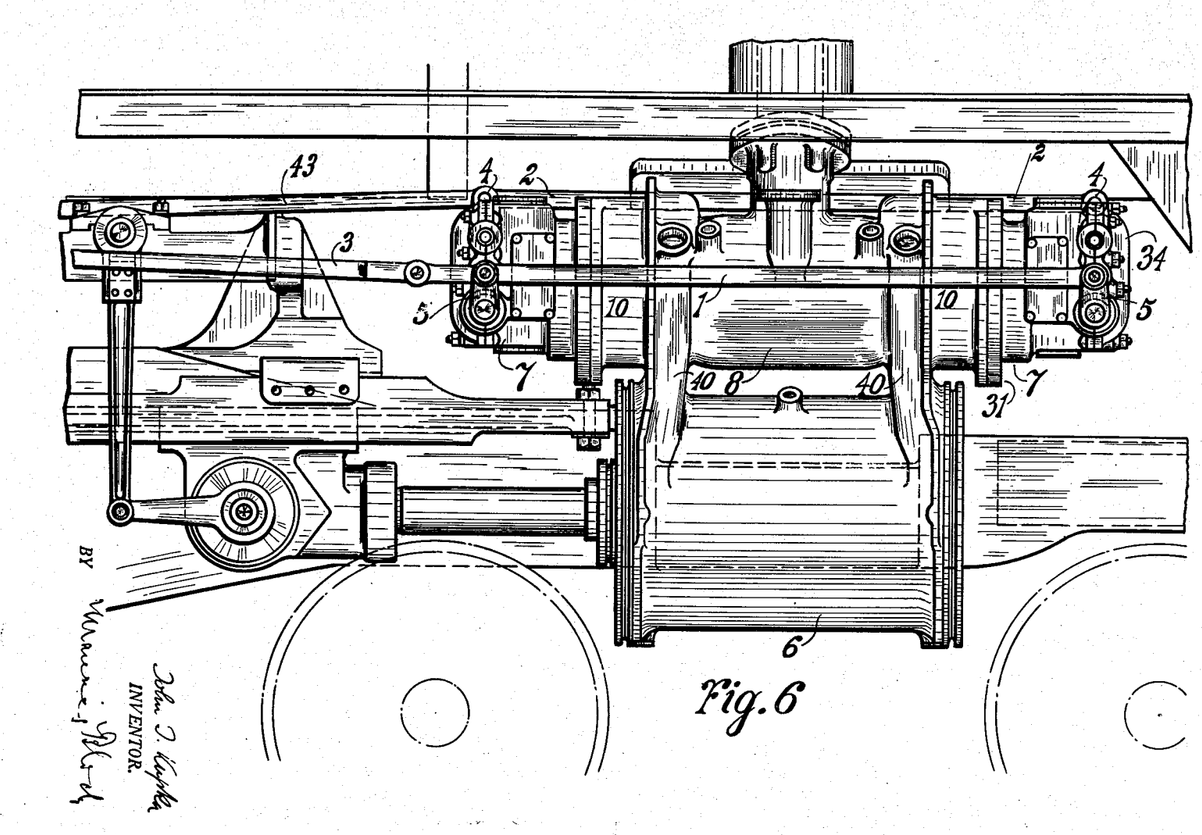
Fig. 6 shows the relationship of the invention in side elevation depicted with so much of a steam engine of the locomotive type as is necessary to clearly illustrate its functioning with the help of the description which follows.

Fig. 6 reveals the provision of two inserts 7 for each steam locomotive cylinder 6. One for the front portion of the steam chest 8 and one for the back portion of same. The front steam chest insert is identical in its construction with the back steam chest insert. The power cylinder of the steam locomotive 6 is of the piston valve type, which employs a steam chest 8 having a circular cross section. Fig 1 and Fig. 2 show more in detail how the steam chest inserts fit into the cylindrical recesses of the steam chest 8. By tightening the steam chest nuts 37, the steam chest insert 7 with its extension 11 is brought to bear on gaskets 29 and 30 in order to seal the steam chest 8 and cylinder port 40 against the exhaust passage connection 10, which communicates directly with the already existing conventional blast pipe in the case of a steam locomotive. Since this exhaust passage arrangement follows established practice and has no direct bearing on the scope of this invention, Fig 1 and Fig. 2 omits the connection to the blast pipe. Fig. 1 and Fig. 2 show furthermore, that each steam chest insert consists of three separate units as far as the structure is concerned. The inner portion 11, extending into the steam chest 8 which carries the admission poppet valve 12, its inner valve seat 13, its outer valve seat 14, its spindle guide bushing 15, its valve spindle 16, its intermediate lever 17 with cam roller 22 which cooperates with the steam admission cam 18 mounted on the splined shaft 19. Control springs 20 create the necessary force aided by the effect of the steam pressure acting on admission valve spindle 16, to maintain contact of the roller 22 mounted in the intermediate lever 17 and the cam 18. The outer portion 7 of the steam chest insert is provided with an appropriate flat wall which contains the inner seatings for each of the two exhaust poppet valves 35.

Figure 3:
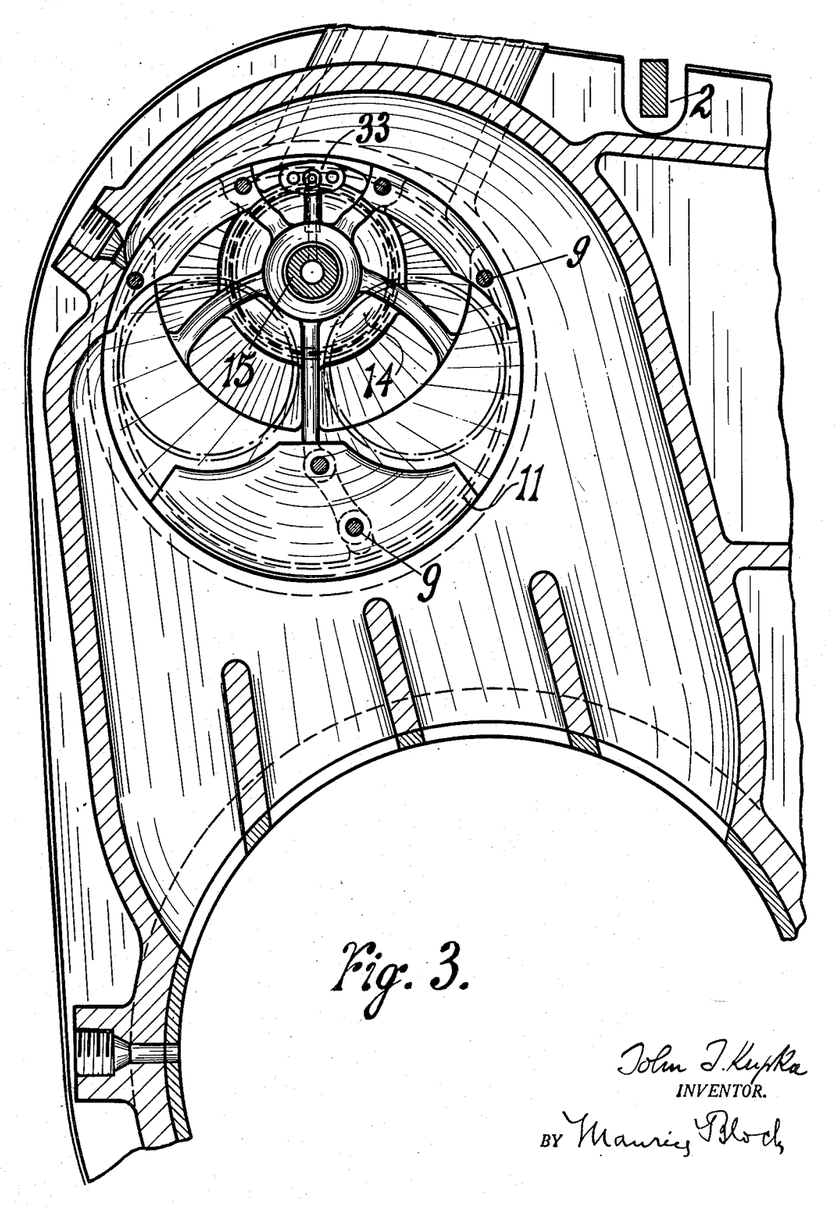
Fig. 3 is a cross sectional view of the aforementioned apparatus showing its relationship to the associated power cylinder following line 3—3 of Fig. 2.
Figure 4:
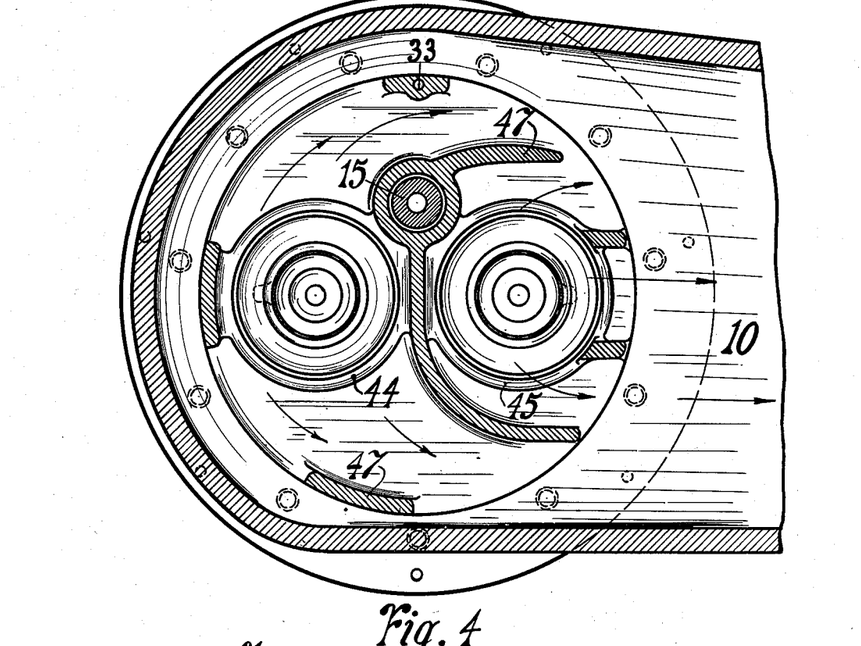
Fig. 4 is a cross sectional view of the aforesaid apparatus and part of the associated power cylinder following line 4—4 of Fig. 1.

By referring to Fig. 2 it will be clearly seen that this new invention establishes the most direct passageway for the exhaust steam or pressure fluid from the port 40 to passage 10 through two poppet valves 35, providing thus the best utilization of the available space. Fig. 4 serves to amplify the underlying principle of this invention as far as adaptation to existing space conditions is concerned. The outer valve seats 44 and 45 of the double seated poppet valves 35 are so arranged that the flow of exhaust steam or pressure fluid from 44 does not interfere with the flow from 45 and the guide walls 47 are not only accomplishing this separation of flow but provide in addition the necessary rigidity for transferring the load of the steam chest bolts to the gaskets 29 and 30 without deformation of the seats for the poppet valves 35. In order to assemble the exhaust poppet valves 35, the steam chest inserts 7 are provided with detachable extensions 11 and these parts are firmly bolted together by means of bolts 9, as is shown by Figure 1 and Fig. 3. The extension 11 carries a suitably shaped foot with cut-outs for the two exhaust poppet valves 35 which is directly attached to a mating part of insert 7. Rigidity in the transfer of the steam chest bolt load to gasket 29 is ensured through appropriate webs shown clearly on Fig. 3, which are so designed that deformations of the seats 13 and 14 for the steam admission poppet valve 12 are kept to a minimum. It will be noted that the steam chest bolt loads are concentrated on the outer rims of the inner portion of the insert 11 to impinge directly on the gasket 29, rather than on the conical shaped support for the poppet valve seat 13.

One important features of the new invention may be stressed at this juncture. Due to the relatively high operating temperature to which the inner portions 11 of the steam chest inserts are exposed by contrast with conditions prevailing in the outer portions 7, which are subjected to the much lower temperature of the expanded pressure fluid, which has completed its cycle within the associated power cylinder, the admission poppet valve spindle guide bushing 15 must be free to move outwardly within its associated recess machined in the structure 7. Restraint of such movement which is the result of thermal expansion due to the temperature gradient existing between parts 15 and the structure 7 would preclude a proper functioning of the steam or pressure fluid admission poppet valve 12. Such restraint would entail deformations within the spindle guide bushing with subsequent jamming of the associated valve spindle 16, hence the working clearance between these parts which is clearly discernible in Fig. 1. A further improvement over the known art relating to steam chest insert construction is constituted by the provision of a separate lubricating line 33 to feed oil to valve spindle 16 independently of the lubrication lines 38 for the two exhaust valve spindles 28 as is shown on Fig. 2. The exhaust valve spindle guide bushings are not subjected to the high temperatures prevailing for the admission valve spindle guide bushings, hence a light press fit is possible. To check any escape of lubricant fed under high pressure through lines 33 and 38, suitable packing glands 42 as shown on Fig. 1 and Fig. 2 are provided.

Figure 7:
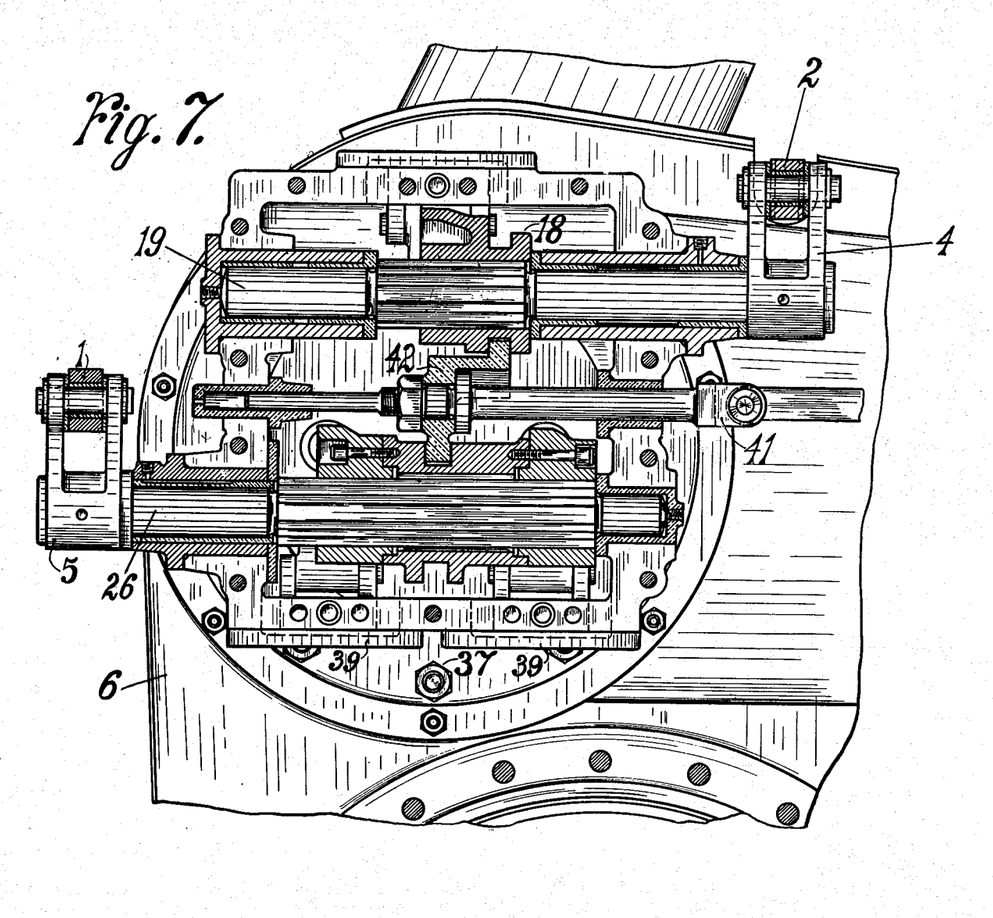
Fig. 7 show an end view of the apparatus described partially in section one line 7—7 of Fig. 1.

As is well known, the greatest advantage of a poppet valve pressure fluid or steam distribution over piston or slide valves is the creation of a timing sequence of the exhaust events in the working cycle as an independent function. Regardless of the pressure fluid admission rate, commonly referred to as the working cut-off, the timing of the opening and closing of the exhaust valves in my new invention can be selected at will, to ensure the best possible expansion ratio and compression ratio. With this in mind, I propose in my new invention two independently driven cam shafts for each steam chest insert. Reference to Fig. 1 will show one splined cam shaft 19 which is associated with the admission cam 18. Fig. 6 and Fig. 7 shows rocker arm 4 actuating this cam shaft and the movement is transmitted through rod 2 which is in turn driven through connecting link 3 from a cam operating mechanism the preferred embodiment of which is disclosed in my co-pending patent application bearing Serial No. 646,665 and dated February 9, 1946.

Figs. 2 and 7 show the cam shaft 26 as a splined member and since two exhaust poppet valves are provided for each steam chest insert, two corresponding exhaust cams 25 are associated with cam shaft 26. Rocker arms 5 imparts the correctly timed oscillating movement to the exhaust cam shafts 26 through rod 1, which is driven from the cam operating mechanism through connecting link 3 as is shown on Fig. 6.

In order to adapt my invention for use in conjunction with a recuperating type of counter pressure brake, the principle of which is fully described in my Patent No. 2,475,790, issued July 12, 1949, I propose in this invention means to selectively seal the exhaust cavities 10 of Fig. 2 against the cylinder ports 40. This can be advantageously effected by providing each exhaust cam 25 with two different profiles, one of which is in engagement with its associated intermediate lever 27 through the cam roller 22 shown by Fig. 1, when the selective means hereafter described are set for power operation. This said cam profile creates alternate lifting and closing actions registering on the associated exhaust poppet valve spindles 28. The closing actions are also influenced by the helical control springs 20, which help to maintain contact between roller and cam profile. For braking operation, shifting fork 42 is brought into action by means of shifting rod 41. This brings another profile of the exhaust cams 25 in engagement. As it is desired to completely close all the exhaust poppet valves 35 irrespective of the oscillating movement of the exhaust cam shaft 26, this secondary cam profile is by necessity circular. Its diameter is selected in such a manner that a small clearance is provided between the end of the exhaust valve spindle 28 and its associated intermediate lever 27, to ensure a positive closure of the exhaust poppet valves. On similar lines, the admission cam 18 which engages by means of splines with admission cam shaft 19 is also provided with two cam profiles, for power operation and brake operation respectively. The cam profile which is effective during the brake operation is shaped in accordance with the requirements which I have formulated in my previously mentioned Patent No. 2,475,790. The selective movement of the shifting fork 24 through shifting rod 41 can be created through a variety of mechanisms and since it does not come within the scope of this invention, no need exists to enlarge on it any further. However, thanks to the previously described features, my new invention lends itself extremely well to an additional useful function, the recuperative dynamic brake action, which is an advancement over the prior art pertaining to steam chest inserts to adapt poppet valves to piston valve cylinders on pressure fluid steam engines of the locomotive type.

By contrast with the steam chest insert constructions to adapt piston valve cylinders to the use of poppet valves which are disclosed by the prior art, my new invention offers an improvement by facilitating a quick check of the correct clearances between the ends of the poppet valve spindles and the associated intermediate levers. This so called tappet clearance must be accurately gauged in order to ensure a proper cam action. Since thermal expansion of the poppet valve spindles and the surrounding structural parts affects the tappet clearances which are prevailing on a cold assembly, it is expedient to do the checking and adjustment when the engine is hot and with this in view, my invention provides easy accessibilty and adjustment facilities in comparison with the prior art. Reference to Fig. 1 shows longitudinally adjustable intermediate lever carriers 23 which permit a variation of the individual tappet clearances. The structural design of steam chest insert 7 provides excellent accessibility for such adjustment and checking operations, after removal of the top inspection cover 21, the two side inspection covers 46 and the two bottom inspection covers 39.

Figure 5:
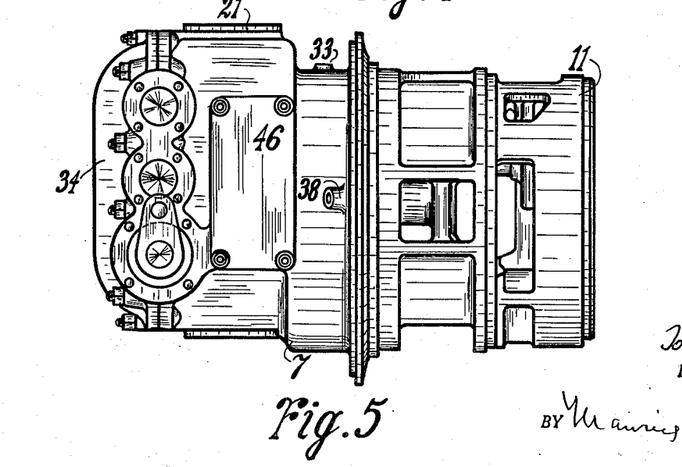
Fig. 5 is an outside view in side elevation of the invention.

The detachable cover 34 shown by Fig. 1 and Fig. 5 is fully exposed to the cooling effect of air currents created by the motion of the locomotive, in the case of application of my invention to such and thus the disadvantages associated with excessive cam box temperatures found in the prior art are not present in this invention.

Finally, mention is made to the means employed to prevent escape to the outside of the steam chest insert of leaking steam from the exhaust passage 10. Fig. 1 discloses the provision of a loose pressure ring 31 which is firmly pressed against the face of the power cylinder casting by means of appropriate bolts. Gasket 32 prevents the escape of pressure fluid through the gap between pressure ring 31 and the mating portion of steam chest insert 7.

The invention thus described illustrates its application to a locomotive steam engine of the reciprocating type. In view of the similarity of power cylinder construction in the case of a reciprocating marine steam engine, it will be readily understood by those skilled in the art, that the scope of the invention is also widened to include this type of prime mover, as well as other types of reciprocating pressure fluid engines having power cylinders of the identical type.

I claim:

1. In reciprocating steam engine of the locomotive type in combination with power cylinders constructed to cooperate with piston valves as steam distributing means, a removable steam chest insert adapted to fit in recesses within the piston valve chest and provided with one admission poppet valve and two exhaust poppet valves as steam distributing means, mechanism to operate said poppet valves, comprising one cam shaft for operation of the steam admission poppet valve, another cam shaft for the operation of the exhaust poppet valves, means to provide freedom of longitudinal thermal expansion within the respective structural portions of the steam chest insert for the poppet valve guide bushings.

2. In reciprocating steam locomotive or marine engine, a power cylinder, a steam chest therefor having circular recesses, one detachable steam chest insert on each end of the said steam chest, poppet valve steam distribution means within said steam chest insert comprising one steam admission poppet valve assembly and two exhaust poppet valve assemblies, appropriate partition walls to establish individual exhaust steam passageways for each exhaust poppet valve within the aforesaid steam chest insert, a cylindrical recess formed within one of said partition walls to allow penetration therein of the associated steam admission poppet valve spindle guide bushing.

3. In reciprocating locomotive steam engine, a power cylinder, a steam chest for said power cylinder with cylinder ports and exhaust conduits suitable for use in conjunction with piston valve steam distributing means, a detachable steam chest insert applicable to each of the two end portions of the aforesaid steam chest, cam operated poppet valve assemblies associated with each of the aforesaid steam chest inserts to effect distribution of steam for the aforesaid power cylinder, two separate cam shafts for the admission poppet valves and exhaust poppet valves respectively associated with the aforesaid detachable steam chest insert, means to selectively shift the poppet valve actuating cams longitudinally on the aforesaid cam shafts, poppet valve adjusting means associated with a portion of the steam chest insert structure which is exposed to the cooling effect of air currents engendered by the motion of the locomotive steam engine and detachable inspection lids provided in aforesaid air cooled portion of the steam chest insert structure.

4. In reciprocating pressure fluid engine, a power cylinder having a pressure fluid receiving chamber of substantially cylindrical cross-section with its axis parallel to the bore of said power cylinder, a removable insert associated with each of the two ends of said pressure fluid receiving chamber comprising a structurally separate portion incorporating a pressure fluid admission poppet valve with its seats, associated valve spindle and guide and a second structurally separate portion incorporating pressure fluid exhaust poppet valves with their respective seats and associated valve spindles and guides and a bore within the second structural portion permitting the pressure fluid admission poppet valve spindle guide to slide freely therein and cam shafts and associated poppet valve operating means, circular recesses formed within the pressure fluid receiving chamber aforesaid cooperating with mating cylindrical parts of the two structurally separate portions of the removable inserts, gaskets fitting within said circular recesses, means to tighten simultaneously from the outside the aforesaid gaskets and means to permit the mounting or removal of the structurally separate portions of the aforesaid inserts in one unit.

5. In reciprocating pressure fluid engine, a power cylinder having a pressure fluid receiving chamber of substantially cylindrical cross-section and co-axial with the bore of the former, cylindrical recesses formed within said pressure fluid receiving chamber, gaskets therefor, removable inserts applied to each of the two extreme ends of said pressure fluid admission chambers, pressure fluid admission and exhaust poppet valves with associated operating means contained within said removable inserts, ring portions in said removable inserts to match the aforesaid cylindrical gasket recesses within the pressure fluid admission chamber, structural elements within said removable inserts arranged to transfer directly the gasket tightening load without distortion of the poppet valve seatings, bolts associated with the extreme end portions of aforesaid pressure fluid receiving chamber for simultaneous tightening of the aforesaid gaskets.

JOHN J. KUPKA.

REFERENCES CITED

The following references are of record in the file of this patent:

UNITED STATES PATENTS

| Number | Name | Date |
|---|---|---|
| 809,081 | Williams | Jan. 2, 1906 |
| 1,245,358 | Lee et al. | Nov. 6, 1917 |
| 1,734,201 | Cassat | Nov. 5, 1929 |
| 2,136,013 | Lentz | Nov. 8, 1938 |
| 2,344,802 | Crawford et al. | Mar. 21, 1944 |

FOREIGN PATENTS

| Number | Country | Date |
|---|---|---|
| 2,895 | Great Britain | Feb. 5, 1910 |
| 22,710 | Australia | May 21, 1935 |